United States Patent [19]

Mayer

[11] Patent Number: 5,526,454
[45] Date of Patent: Jun. 11, 1996

[54] METHOD FOR PRODUCING OPTICAL POLYMER COMPONENTS HAVING INTEGRATED FIBRE-CHIP COUPLING BY MEANS OF CASTING TECHNOLOGY

[75] Inventor: Klaus-Michael Mayer, Gerlingen, Germany

[73] Assignee: Robert Bosch GmbH, Stuttgart, Germany

[21] Appl. No.: 318,661

[22] PCT Filed: Mar. 18, 1993

[86] PCT No.: PCT/DE93/00248

§ 371 Date: Oct. 11, 1994

§ 102(e) Date: Oct. 11, 1994

[87] PCT Pub. No.: WO93/21550

PCT Pub. Date: Oct. 28, 1993

[30] Foreign Application Priority Data

Apr. 10, 1992 [DE] Germany .................. 42 12 208.2

[51] Int. Cl.[6] .................. G02B 6/30; B29D 11/00
[52] U.S. Cl. .................. 385/49; 385/14; 385/50; 385/52; 385/130; 385/131; 385/132; 264/1.1; 264/1.24; 264/1.25
[58] Field of Search .................. 385/14, 15, 31, 385/38, 49, 50, 51, 52, 65, 88, 89, 129, 130, 131, 132; 264/1.1, 1.24, 1.25, 2.7, 2.1, 1.7

[56] References Cited

U.S. PATENT DOCUMENTS 5,059,763 10/1991 O'Brien et al. .................. 385/49 X

FOREIGN PATENT DOCUMENTS

| 331338 | 2/1989 | European Pat. Off. .......... 385/49 X |
| 324492 | 7/1989 | European Pat. Off. .......... 385/49 X |
| 388642 | 9/1990 | European Pat. Off. .......... 385/49 X |
| 1094305 | 7/1989 | Japan .................. 385/49 X |

OTHER PUBLICATIONS

Applied Optics, Mar. 15, 1978, vol. 17, No. 6, pp. 895–898, "Optical Coupling from Fibers to Channel Waveguides Formed on Silicon", J. T. Boyd et al.

Primary Examiner—Brian Healy
Attorney, Agent, or Firm—Spencer & Frank

[57] ABSTRACT

A method is proposed for producing passive and/or active optical polymer components having integrated fibre-chip coupling by means of casting technology. For this purpose, the master structure is produced in common on a silicon substrate both for accommodating an optical waveguide and a fibre-guiding structure anisotropically etched into the substrate [sic], this master structure is cast by electroplating and the negative mould thus produced is used to produce daughter structures identical to the master structure, the anisotropically etched V-shaped positioning trenches being filled with polymer materials, so that a planar surface is produced, the planar surface is coated with a photoresist or another structurable polymer, trench-shaped openings which subsequently produce the optical waveguides are structured into the polymer coating, and the trench structures are opened by means of laser ablation.

20 Claims, 4 Drawing Sheets

METHOD FOR PRODUCING OPTICAL POLYMER COMPONENTS HAVING INTEGRATED FIBRE-CHIP COUPLING BY MEANS OF CASTING TECHNOLOGY

BACKGROUND OF THE INVENTION

The invention relates to a method for producing optical polymer components having integrated fibre-chip coupling using casting technology, wherein the optical polymer components have a region for accommodating an optical waveguide and a V-shaped positioning trench for accommodating an optical fibre to be coupled to the optical waveguide. More particularly the present invention relates to such a method which is applied in the mass production of monomode or multimode components in integrated optics having monolithically integrated fibre-chip coupling.

The increasing use of integrated optical components for optical communications, for sensory analysis and the field of computers (optical databus) lends optical interconnection technology (chip-fibre coupling) an ever growing significance. In this case, even relatively small private exchanges having approximately 1,000 subscriber lines require, for example several thousand optical connections between the individual switching substages, since the number and complexity of the integrated optical components on individual substrates is severely restricted owing to the extreme aspect ratios in optics.

In such applications, the realisability and reliability (mechanical and thermal stability) of optical interconnection technology determines and the required outlay on connections finally determine the achievable degree of expansion of an optical exchange system or of an optical communication network.

The light coupling efficiency in the case of coupling of glass fibres and integrated waveguides of the components depends strongly on the spacing of the end faces and very strongly on a lateral displacement as well as on an angular tilt of the optical axes with respect to one another. Consequently, in the coupling the glass fibre has five degrees of freedom which have to be optimised independently of one another: one axial degree of freedom, two lateral degrees of freedom and two angular degrees of freedom. In the case of the field distributions typical of glass fibres, a lateral offset of only a few μm, for example, already leads to coupling losses in the dB range. An effective coupling method requires a reduction in the degrees of freedom as well as a possibility of simultaneously positioning all the fibres of a bundle. Appl. Opt. (1978), page 895, "Optical coupling from fibres to channel waveguides formed on silicon", J. T. Boyd and S. Sriram discloses etching V-grooves into a silicon substrate as positioning trenches for the glass fibres. The anisotropically etched V-grooves are bounded on all sides by slowly etching {111}—planes which enclose an angle of 54.7° with respect to the wafer surface. Arranged flush with these V-grooves are the integrated waveguides, it being possible to optimize the width of the grooves such that the resulting shape of the groove causes the fibre core to lie in the same horizontal plane as the optical waveguide. The end face of the V-groove situated in the region of the coupling surface to the optical waveguide is likewise inclined at an angle of 54.7°, so that the glass fibre cannot be pushed up completely as far as the waveguide. Boyd and Sriram propose as a solution to this problem to provide the glass fibre with an end face inclined likewise at 54.7° in order in this way to push the fibre core against the integrated optical waveguide as far as butt coupling. However, this method has the disadvantage that a complicated processing of the end face of the fibre is required, and the fibre may be inserted into the groove only in a specific position. Moreover, in the coupling there is the risk of the two end faces sliding on one another, or of at least the end region of the fibre therefore being pushed out of the groove. An additional difficulty arises from the necessity of providing not only the fibre, but also the integrated waveguide with a correspondingly inclined end face.

This method has, furthermore, the decisive disadvantage that mass production of integrated optical components is impossible. However, it is precisely mass production that is a precondition for efficient and practicable application.

H. Hosokawa et al. disclose in Integrated Photonics Research Conf., Paper MF6 (1991) carrying out the simultaneous production of optical waveguide structures and grid structures for light coupling by means of a compression technology and subsequent photopolymerisation. However, this compression technology for monomode optical waveguides is not capable of realising the guidance of fibres integrated on a substrate.

Also known, moreover, is the principle of casting by electroplating and injection-moulded duplication of microstructures by lithography using synchrotron radiation, the so-called LIGA method. Here, the primary structures to be cast are usually produced by X-ray exposure of plastics on the synchrotron and the mould inserts for the injection moulding are prepared therefrom by electroplating. It is not possible using this method to achieve an exact height adjustment of fibre-guiding structures with the simultaneous production of optical waveguides and fibre-guiding structures. However, as also described above, it is precisely the exact adjustment that is the indispensable precondition for achieving high coupling efficiencies between fibres and waveguides, since even the slightest vertical and/or lateral deviations in the submicrometer range lead to impairment of efficiency.

Furthermore, it is disadvantageous in all known methods that no final adjustment of the fibre-chip coupling is possible by means of a protective covering which simultaneously protects against mechanical and other external influences.

SUMMARY AND ADVANTAGES OF THE INVENTION

The method according to the invention and to the characterising part of the main claim (offers, by contrast, the advantage that it is possible to mass produce on a common integrated optical chip polymer components having integrated and self-adjusting coupling of fibre-guiding structures on optical waveguide components.

For this purpose, high-precision, preadjusted primary structures, the master structures, are produced on silicon wafers, cast by electroplating and subsequently duplicated in polymer plastics using the injection-compression moulding method.

Further modifications and embodiments are specified in the subclaims.

V-shaped trench structures are etched into the {100} oriented wafer in a simple way using known anisotropic etching techniques of silicon, a high-precision structure being produced via which the later exact position of the fibre structure and waveguide structure relative to one another is defined.

Such a V-groove is particularly suitable as a fibre-guiding structure, since the angular adjustment parallel to the crystal surface is set up automatically and it is possible for the height of the fibre core above the wafer surface to be set exactly and monitored in terms of production engineering via the aperture width of the V-groove.

In an advantageous way, the V-grooves are filled with polymer materials and the planar surface produced is subsequently coated with a photoresist or another structurable polymer. According to the invention trench-shaped openings which define the dimensions of the subsequent optical waveguides are structured into the cover layer thus produced.

Furthermore, according to the invention, the trenches are subsequently reopened by means of excimer laser ablation technology, which is known per se, and vertical fibre structural stops are cut in a particularly advantageous fashion on the end of the V-grooves on the wave structure side.

It has been found that selective removal of the organic polymers is possible in a simple way without the silicon surfaces of the master structure being attacked. The laser ablation technology is also particularly suitable for exposing the precisely defined vertical fibre stop.

In a further advantageous embodiment of the invention, it is provided that the master structure consisting of the preliminary optical waveguide structure and integrated fibre-guiding structure is cast using an electroplating method known per se.

The negative mould thus produced is used to produce numerous daughter copies of the master structure. This is preferably performed using injection-compression moulding methods in polymer materials of suitable optical characteristics.

In a further embodiment of the invention, it is provided to produce simultaneously with the master structure for the fibre-chip coupling, a master structure for a cover plate which is connected to the fundamental element, is likewise cast by electroplating in accordance with the method described above, and serves to produce daughter structures.

It has proved to be particularly advantageous when the connection between the fundamental member supporting the fibre-guiding and waveguiding structure and the cover plate is formed by a break edge. The break edge is achieved in a simple way by providing that simultaneously with the anisotropic etching of the fibre-guiding structures small V-shaped paired structures are etched correspondingly spaced with respect to one another along the subsequent break edge.

The spacing of the paired V-grooves with respect to one another then simultaneously determines in a particularly advantageous way the subsequent spacing between the polymer baseplate and cover plate.

Etched simultaneously in the region of the subsequent cover plate are further guide grooves which are arranged in such a way that after the cover plate has been folded down, an adjustment of the inserted glass fibres is performed in a manner true to size along the break edge.

It is particularly advantageous that the master structure for the complete subsequent polymer component, including the cover, is now laid on a single silicon wafer, and that a subsequent adjustment of the cover and substrate is performed by the break edge automatically and with the required precision.

This common master structure is now cast by electroplating in one piece, and the negative mould produced is used for the common production of the daughter structures.

In this case, in order to achieve the break edge a second negative mould is prepared which has a large V-groove which has been prepared via the anisotropic etching technology already described which fits exactly in a laterally inverted fashion between the smaller paired V-grooves. This produces a fine micromechanical adjustment of two mould inserts.

Since the angles of inclination of the respective master structures of the two negative moulds are opposite one another, the guiding structures fit onto one another in a planar fashion.

The fundamental element and cover plate can, in principle, also equally well be produced, cast and duplicated separately.

Together with the dimensions of the waveguide cross-section, the optical field distribution in the waveguide can be modelled by means of the selection of the refractive indices of a cover plate, polymer-filled waveguide ducts and polymer fundamental member. Optimum coupling efficiencies between the glass fibre and optical waveguide can be achieved in conjunction with cost-effective, self-adjusting assembly technology due to the direct contacts between the light-conducting polymer with the glass fibre and the adjustable, virtually radially symmetrical field distribution of the optical fields in the optical waveguide.

It is, further, within the scope of the invention that the optical polymer components having integrated fibre-chip coupling that are obtained by means of the production method described are also used for active polymer components.

For this purpose, instead of a passive polymer, a nonlinear optical (NLO) polymer or, for example, a polymer doped with rare earths is inserted into the trench-shaped openings provided for the optical waveguides. The fashioning of the connection between the fibre-guiding structure and waveguide structure is achieved in the manner already described above, so that here, too, perpendicular connection is produced between the glass fibre and optical waveguide.

The selection of the NLO polymer used, a passive or a doped polymer, conforms with the use of the polymer component as, for example, an optooptic, acoustooptic, magnetooptic electrooptic or thermooptic component or as an optical amplifier.

According to the invention, for electrooptic or thermooptic components polymer films supporting printed conductors and electrodes are inserted in accordance with the desired layout of the NLO components or the thermooptic components between the fundamental member, which has the fibre-guiding structure and waveguide structure, and the cover plate. The desired influence, for example, the triggering of a switching function, is exerted on the polymer via the printed conductors and electrodes.

The production of the baseplate, cover plate and switching film cutouts is performed in the already described coherent fashion.

In the case when switching films are used, the recesses in the cover plate are modelled with a smaller depth in accordance with the switching film thickness.

In the case the embodiment of a coherent baseplate and cover plate, the thickness of the switching film is to be allowed for by the spacing of the paired V-grooves along the break edge.

DRAWING

Exemplary embodiments of the invention are represented in the drawings and explained in more detail in the following description.

DETAILED DESCRIPTION OF THE EXEMPLARY EMBODIMENTS

Figure 1:
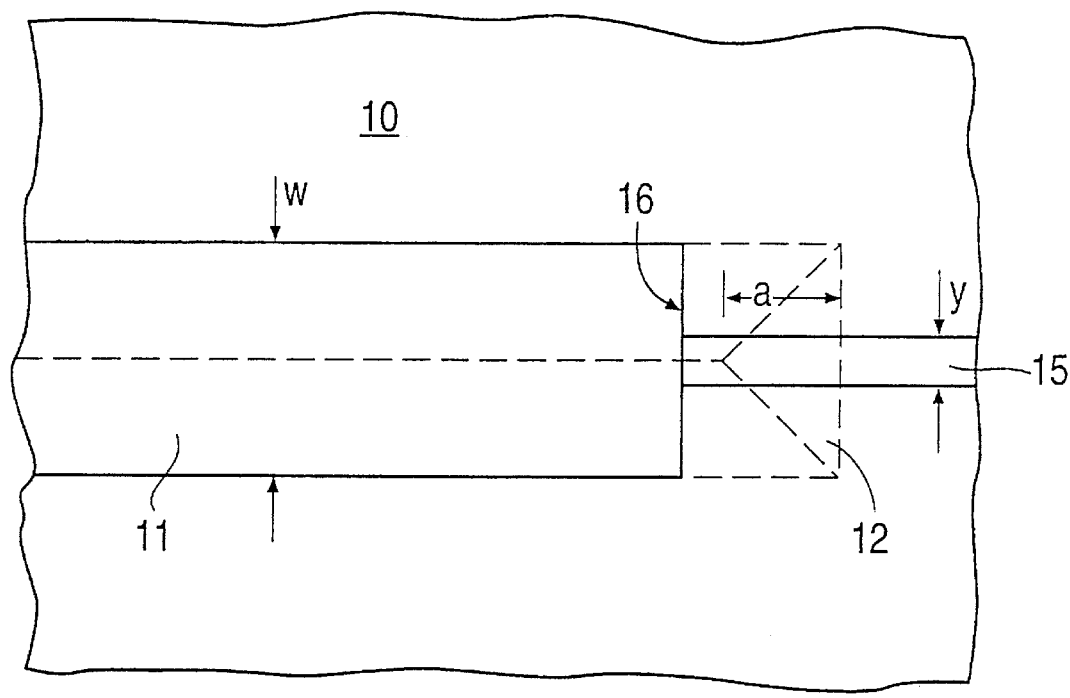
FIG. 1 shows a plan view of a detail from a master structure on a silicon substrate.
Figure 2:
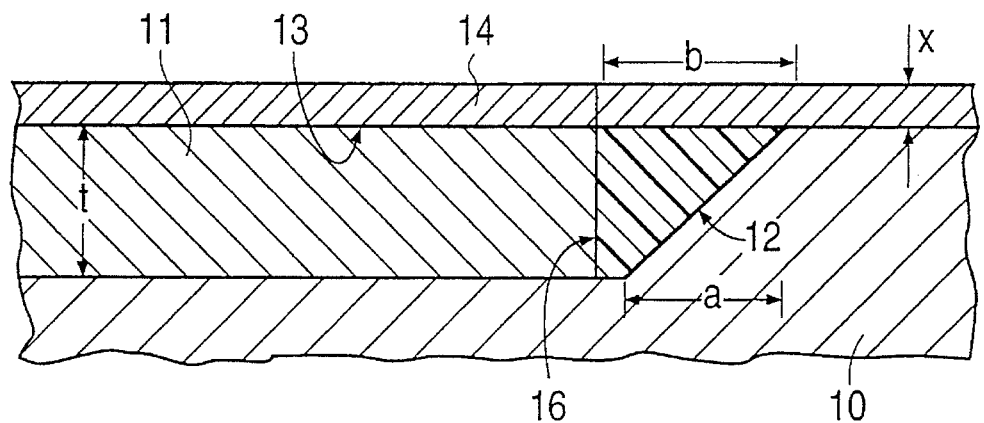
FIG. 2 shows a longitudinal section of the master structure represented in FIG. 1.

The master structure represented in FIGS. 1 and 2 shows a detail (fibre guidance/waveguide coupling point) of a subsequent component. The master structure consists of a silicon substrate 10 into which a positioning trench 11 having a V-shaped cross-section is anisotropically etched for the purpose of accommodating a glass fibre (not represented here). The known anisotropic etching technology is very highly developed, and is also used in the prior art specified at the beginning. The depth t of the positioning trench 11 is set with the aid of the width w of a rectangular opening in the etching mask. V-shaped depressions which enclose a very precise angle of 54.7° relative to the surface are produced with the aid of alkaline etchants such as, for example, potassium hydroxide. Such an angle is also formed at a sloping end face 12 of the positioning trench 11 which extends over a length a into the positioning trench 11. The inclined {111} side faces formed in this case form a natural etching stop defined by the anisotropic etching characteristics of the crystal.

The following relationship holds for the subsequent height of the fibre core $$\delta = \frac{R}{\cos\alpha} - \frac{w}{2} \tan\alpha,$$

with R being the fibre cladding radius, $\alpha$ the angle of inclination of the {111} surfaces with respect to the wafer surface, and w the width of the positioning trench 11 on the wafer surface.

A change in the height of $\Delta\delta 0.7$ μm results from a change of w=1 μm.

After etching of the positioning trench 11, the latter is filled with polymer materials, so that a planar surface 13 is produced. The surface 13 is then provided with a layer 14 made from photoresist or another structurable polymer.

Structured into the layer 14 is a trench-shaped opening 15 which has the dimensions x and y and whose cross-section need not necessarily be rectangular. Exposure methods (photolithography), laser ablation or dry etching methods such as have been developed for microstructuring are suitable, for example, as structuring methods for the cover layer 14.

The size of the subsequent optical waveguide provided in this trench-shaped opening 15 is defined by the dimensions x and y.

The positioning trench 11 adjacent to the trench-shaped opening 15 is now opened by means of an excimer laser ablation technique in such a way that a perpendicular surface 16 is produced in this case. The perpendicular surface 16 serves as a stop for the glass fibre (not represented here) to be inserted subsequently. The smooth surface 16 produced by the laser technique renders unnecessary any further processing of the glass fibre to be inserted. The cut is performed at a spacing b from the upper end edge of the positioning trench 11, this spacing b exceeding the extent a of the sloping end face 12 and thus making possible a subsequent butt coupling between the glass fibre and optical waveguide.

The subsequent relative height of the optical axes of the glass fibre and the optical waveguide are thus set overall only over the depth of the positioning trench 12, in accordance with the relationship already set forth above.

Figure 3:
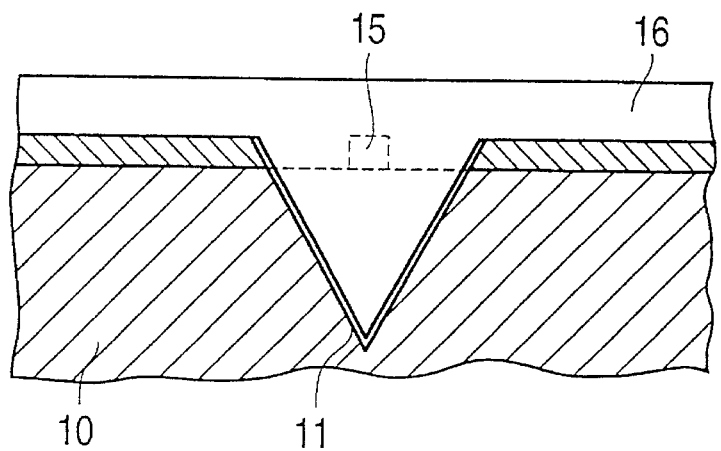
FIG. 3 shows the master structure, represented in FIGS. 1 and 2, with an electroplating mould insert.

FIG. 3 shows how the master structure produced is cast by electroplating.

Figure 4:
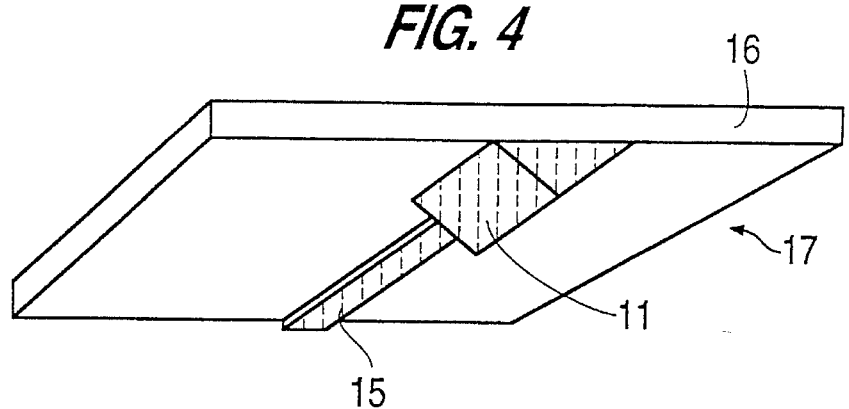
FIG. 4 shows a negative mould.

For this purpose, the master structure is conductively metallised and a negative mould 16, which has the same dimensions as the positioning trench 11 and the trench-like opening 15, is prepared by means of already known electroplating methods, for example based on nickel. FIG. 4 shows a released negative mould. Clearly recognisable are the prismatic image of the positioning trench 11 and the image of the opening 15, which subsequently accommodates the optical waveguide.

Numerous daughter copies are produced using injection-moulding or injection-compression moulding methods in the polymer material, for example polymethyl methacrylate (PMMA) with the aid of the die produced from the negative mould 17. The daughter copies have exactly the same styling as the master structure.

Figure 5:
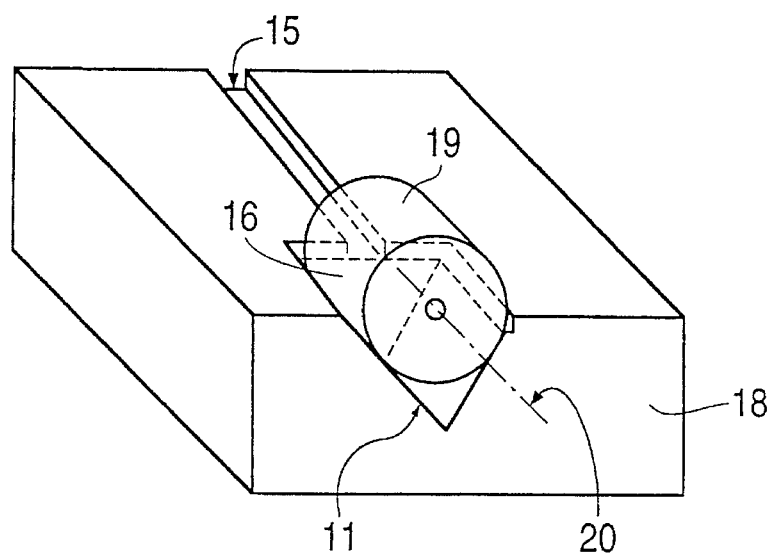
FIG. 5 shows a daughter structure obtained using the negative mould represented in FIG. 4.

A daughter structure 18 with an inserted glass fibre 19 is shown diagrammatically in a perspective view in FIG. 5. The inserted glass fibre end terminates with its one end in a planar fashion with the vertical surface 16 of the daughter copy 18. Due to the V-shaped positioning trench 11, the optical axis 20 of the glass fibre 19 comes to be situated at the level of the trench-shaped opening 15 which subsequently accommodates the optical waveguide.

Figure 6:
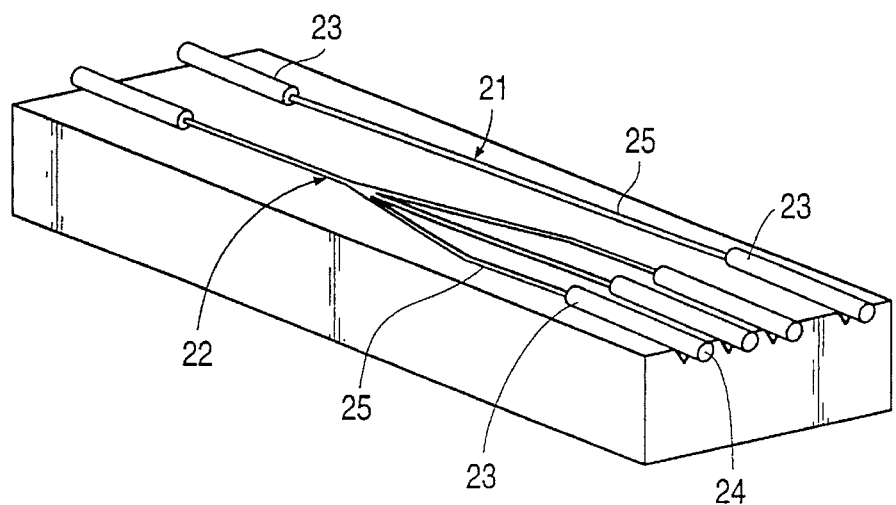
FIG. 6 shows an example of a practical application in an optical polymer component having integrated fibre-chip coupling, but without the associated cover plate.

A further exemplary embodiment is represented in FIG. 6. For the purpose of a better explanation, the mode of procedure explained in FIGS. 1 to 5 referred to a single integrated coupling of the glass fibre with an optical waveguide.

However, in practice there will generally be a large number of glass fibres which are to be simultaneously connected. FIG. 6 shows the application with reference to the example of a simple connection 21 and a simultaneous branching 22 on the same component. The coupling regions 23 between the glass fibres 24 and the optical waveguides 25 have the structure described in FIGS. 1 to 5.

For representational reasons, the cover plate, which terminates the waveguide above and which guides the glass fibres upwards in suitable recesses, is not drawn in FIG. 6.

Figure 7:
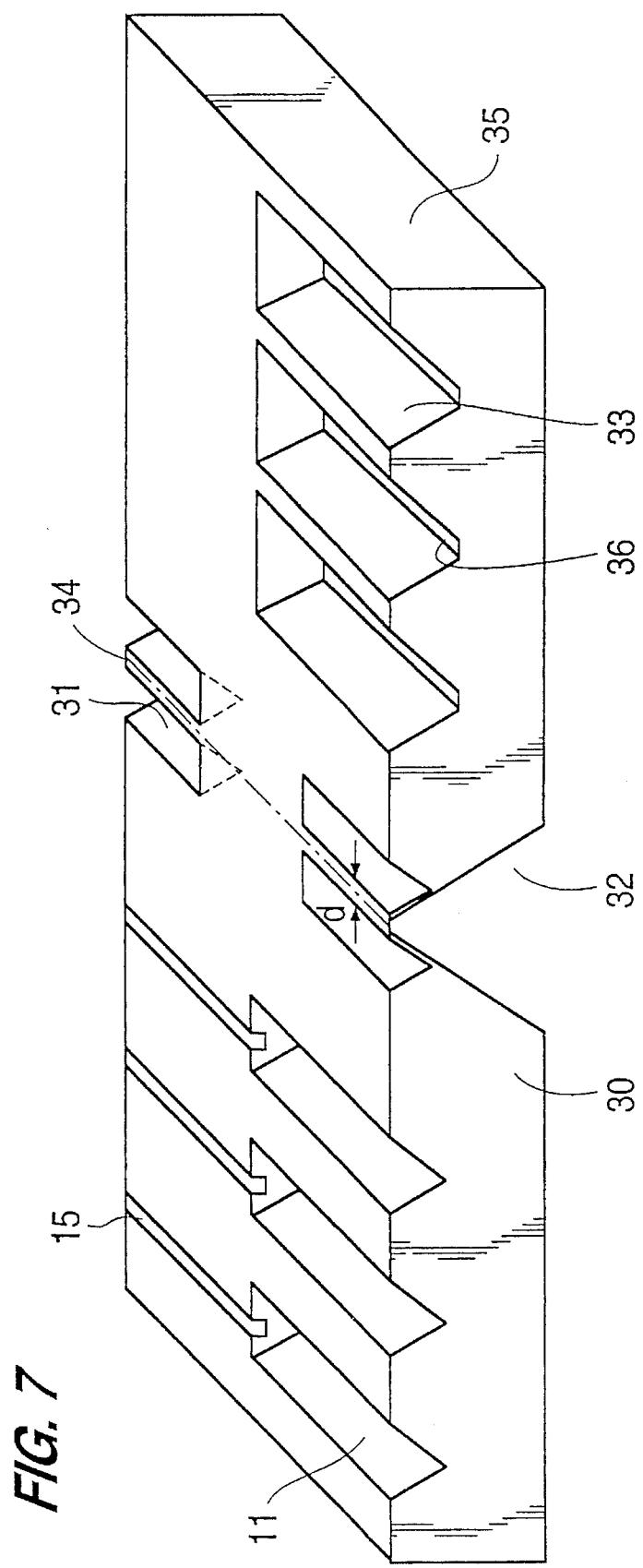
FIG. 7 shows an optical polymer element having a simultaneously provided cover.

An optical polymer component 30 having integrated fibre-chip coupling and consisting of a baseplate 30 and cover plate 35 is shown in FIG. 7 in a state not yet folded down. In order to improve the illustration, the inserted glass fibres and the light-conducting polymer to be filled into the waveguide trenches are not represented.

Clearly recognisable are the positioning trenches 11 having a V-shaped cross-section, which are adjoined by the trench-shaped openings 15 for the optical waveguides. The component has, furthermore, paired V-shaped grooves 31 which are spaced from one another by the spacing d. A further V-shaped groove 32 engages from the opposite side in the interspace of the grooves 31 that is produced. Because of the way they are produced, the V-grooves 31 and 32 have side faces with the same angle of inclination.

The polymer component has further grooves 33, whose imaginary centre lines have the same spacing from the break edge 34 as the imaginary centre lines of the grooves 11.

The method of functioning of the optical polymer component is as follows:

The glass fibre ends are inserted into the positioning trenches 11 and the trench-shaped openings 15 are filled with a light-conducting prepolymer whose index of refraction is slightly higher than that of the baseplate and cover plate. Subsequently, the cover plate 35 is folded down along the break edge 34 and pivoted onto the side accommodating the glass fibres and optical waveguides. In the finally assembled state, the grooves 33 press the glass fibres into the positioning trenches 11 in a manner true to size.

The mechanical connection between the cover plate and structured side is made by the same thermally or optically crosslinkable prepolymer which is filled into the light-guiding trenches before the joining. Supernatant liquid polymer is pressed flat during assembly and ensures a planar connection as a thin film after the crosslinking. The spacing produced between the cover side and structured side is set by the width of the spacing d of the grooves 31.

The master structure for the polymer cover plate 35 is likewise produced by anisotropic etching of silicon wafers. In this case, the cover plate can be produced independently of the baseplate or—as represented in FIG. 7—in common therewith on a silicon substrate. The width of the mask opening is to be selected in this case to be so large that the fibre core is not guided through the {111}-surfaces. By monitoring the etching time, the etching is discontinued when a wide groove 33 having an etched bottom 36 is produced whose depth reaches exactly the value of the fibre cladding radius minus the height of the fibre core.

The production of the fibre end stop of the grooves 33 is likewise effected by filling up, as already described above, the etched groove with polymer materials and by subsequent laser cutting.

Figure 8:
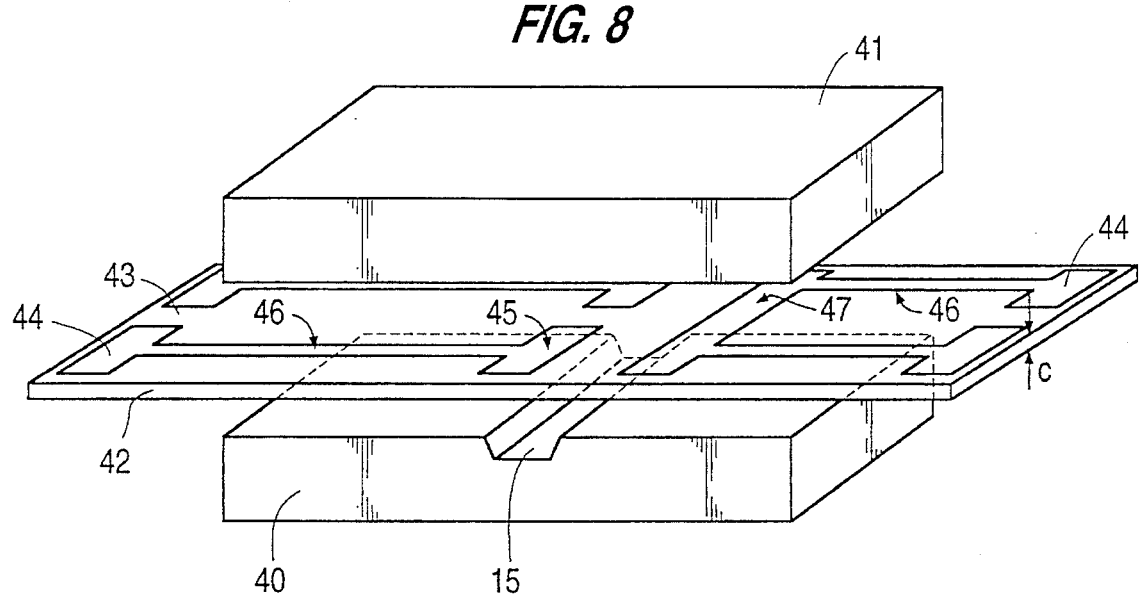
FIG. 8 shows an example of a practical application of an active optical polymer component.

An active optical polymer component is shown in FIG. 8. In order to improve the illustration, only the region of the waveguide structure is represented. The integrated fibre-chip coupling (not represented) at the inputs and outputs of the component is the same as has already been described in FIGS. 1 to 7.

The component has a polymer baseplate 40 having a trench-shaped opening 15 for the optical waveguide and a cover plate 41. Arranged between the baseplate 40 and the cover plate 41 is an optical buffer film 42 which has on its cover-side surface 43 electrical printed conductors 46 provided with terminal lugs 44 and electrodes 45.

The electrodes 45 serve to control the switching function and are necessary in the immediate vicinity of the optical waveguide. The electrode arrangement must guarantee a thorough penetration of the NLO polymer by the electric fields between them. On the other hand, the metallic printed conductors must be sufficiently optically insulated from the optical waveguides in order to avoid strong optical attenuation. The electrical printed conductors 46 and electrodes 45 are applied in a planar fashion to the polymer film 42 in accordance with the layout of the NLO component. This film acts over its thickness C as an optical buffer layer, since the index of refraction of the buffer film 42 is smaller than that of the optical waveguide but larger than or equal to the index of refraction of the baseplate 40 and the cover plate 41. Since, depending on the layout of the waveguides, the desired light wavelength and the refractive index conditions, the thickness C is only a few μm, the buffer film is firstly stabilised by a supporting film. The buffer film 42 is laminated onto the cover plate 41 together with the finally structured electrode 45, and the supporting film is peeled off. The glass fibre recesses in the cover plate are kept free, or are firstly covered by the film and subsequently cut out, for example by laser processing. The depth of the recess in the cover plate 41 is reduced by the thickness e of the buffer film.

The assembly of the polymer baseplate 40, glass fibre, polymer cover plate 41, with buffer film 42 laminated on and electrodes 45, and light-conducting NLO polymer is performed as already frequently described above. In order to be electrooptically active, the NLO polymer must be a so-called non-centrosymmetric $\chi(2)$-polymer. The latter must be polarised in an electric field in order to set a molecular preferred direction which is necessary for the linear electrooptic effect.

In the described active optoelectric component, the $\chi(2)$-polymer is polarised before the crosslinking, that is to say whilst still in the liquid state directly after being filled in by applied electric fields via the electrodes 45 on the buffer film 42, and only then crosslinked in the polarised state. Because of the high molecular mobility in the liquid state, it is thus possible for very high polarising efficiencies to be achieved even in the case of low field strengths and to be stabilised permanently after the crosslinking.

For the purpose of electrical connection, the buffer film 42 can either project laterally from the polymer component, and thus permit a simple plug-type film contacting, or be supported via a projecting baseplate 40, in order to permit simple bonding.

FIG. 8 also shows use as a thermooptic component with reference to example of the right-hand electrode 47. The electrode 47 is constructed as a heating film and is arranged above the optical waveguide.

The index of refraction in the waveguide section situated therebelow is lowered by a local temperature increase. Typical changes in index of the optical polymer are $10^{-4}$/°C. It is therefore possible to realise thermooptic switching elements using integrated polymer technology by means also of passive optically conductive polymers, for example with the aid of optical adhesives having a suitable refractive index. Because of the strong thermooptic effects of the polymers, temperature changes of a few °C. in one of the interferometer arms of a 2×2 switch constructed, for example, as a Mach-Zehnder interferometer suffice in order to switch over from the cross state into the bar state.

The use of active polymer components having integrated fibre guidance as optical amplifiers integrated in a planar fashion is conceivable as a further example. For this purpose, use can be made of the effects of parametric amplification, in $\chi(3)$-polymers, or of an optically pumped, stimulated emission by filling in with light-conducting polymers doped with rare earths, for example $Er^{3+}$, and coupling in a matched pumping laser via integrated couplers on the chip.

It becomes clear that the method for producing optical, both passive and active, polymer components having integrated fibre-chip coupling by means of casting technology does not remain restricted to a single connection.

By appropriate construction of the etching mask for fibre-conducting structures and the structuring mask for waveguide trenches, it is possible to obtain any desired negative moulds for producing the master structure for a polymer component, and thus to obtain daughter copies in the manner described and in large piece numbers.

In particular, the described production method is suitable both for monomode components of optical communications and optical sensory analysis, as well as for multimode components, for example in local optical networks.

Instead of glass fibres, it is possible to use plastic optical fibres for the same purpose.

Instead of silicon substrates, it is also possible to use other anisotropically etching substrate materials, for example indiumphosphide, for the same purpose.

I claim:

1. Method for producing optical polymer components having integrated fibre-chip coupling by means of casting technology, the optical polymer components having a region for accommodating an optical waveguide and a V-shaped positioning trench for accommodating an optical fibre to be coupled to the optical waveguide, characterised in that a master structure is produced in common on a silicon substrate both for accommodating an optical waveguide and a fibre-guiding structure anisotropically etched, in a manner known per se, into the substrate, this master structure is cast by electroplating and the negative mould thus produced is used to produce daughter structures identical to the master structure by means of injection-compression moulding methods in polymer plastics, the anisotropically etched V-shaped positioning trenches are filled with polymer materials so that a planar surface is produced, the planar surface is coated with a photoresist or another structurable polymer, trench-shaped openings which subsequently produce the optical waveguides are structured into the polymer coating, and the trench structures for fibre guidance are preferably opened by means of laser ablation.

2. Method according to claim 1, characterised in that the trench-shaped openings for the optical waveguides are etched into the silicon substrate instead of being structured into the polymer coating.

3. Method according to claim 1, characterised in that the opening of the trench structures is performed such that a surface which extends perpendicular to the axial direction of the trench structures and forms a stop is cut at the subsequent end of the positioning trench on the optical waveguide side.

4. Method according to claim 1, characterised in that the opened trench structures are cast in a following step by means of electroplating technology.

5. Method according to claim 1, characterised in that the master structure imaged in the negative mould is used in a next step in order to produce a multiplicity of identical daughter structures.

6. Method according to claim 5, characterised in that the daughter structures are produced by at least one of injection-moulding, injection-compression moulding, compression moulding, vacuum compression moulding, pressure moulding, transfer moulding, casting and vacuum casting methods.

7. Method according claim 1, characterised in that the master structure and the identical daughter structures thereof are simultaneously produced for a multiplicity of fibre-chip couplings provided on a optical polymer component.

8. Method according to claim 1, characterised in that a master structure for a cover plate connected to the fundamental element is prepared simultaneously with the master structure for the fibre-chip coupling.

9. Method according to claim 8, characterised by the etching of mutually spaced paired parallel V-shaped structures whose parallel spacing of the inner terminal edge determines the spacing between the baseplate and the cover plate.

10. Method according to claim 9, characterised in that guide grooves are etched into the cover plate which are arranged in such a way that they accommodate and adjust glass fibres to be covered in a manner true to size.

11. Method according to claim 1, characterised in that a second negative mould is used in casting the polymer components which has a V-shaped structure which engages in a laterally inverted fashion between the paired V-shaped structures, which are laid parallel, and effects fine micromechanical adjustment of the two negative moulds.

12. Method according to claim 8, characterised in that glass fibre ends are inserted into the positioning trenches in the cast polymer components, the trench-shaped openings are filled with a light-conducting polymer, and pivoted onto the cover plate is folded down and the baseplate.

13. Method according to claim 12, characterised in that the connection between the baseplate and cover plate is made by a projecting prepolymer which can be crosslinked thermally or optically.

14. Method according to claim 8, characterised in that the baseplate and the cover plate are produced individually and adjusted during assembly.

15. Method according to claim 12, characterised in that the trench-shaped openings are filled with a nonlinear optical polymer and a polymer film supporting printed conductors and electrodes is inserted between the baseplate and cover plate.

16. Method according to claim 15, characterised in that the polymer film is laminated onto the cover plate before assembly with the baseplate.

17. Method according to claim 15, characterised in that the filling polymers exhibit electrooptic, acoustooptic, magnetooptic or thermooptic effects or else optical fluorescence and stimulated emission (optical amplification).

18. Method according to claim 15, characterised in that a filling electrooptic polymer is polarised while still in the liquid state directly after filling and the assembly of the cover plate via an applied electric field by means of the electrodes mounted on the polymer film and is only then permanently crosslinked in the polarised state.

19. Method according to claim 1, characterised in that passive and active optical polymers are used in a combined fashion in an optical polymer component.

20. Optical polymer component having integrated fibre-chip coupling, with the Optical polymer component having a region for accommodating an optical waveguide and a V-shaped positioning trench for accommodating an optical fibre to be coupled to the optical waveguide, with the component being characterized in that it was produced in accordance with the following method: a master structure is produced in common on a silicon substrate both for receiving an optical waveguide and a fibre-guiding structure anisotropically etched, in a manner known per se, into the substrate, this master structure is cast by electroplating and the negative mould thus produced is used to produce daughter structures identical to the master structure by means of injection-compression moulding methods in polymer plastics, the anisotropically etched V-shaped positioning trenches are filled with polymer materials so that a planar surface is produced, the planar surface is coated with a photoresist or another structurable polymer, trench-shaped Openings which subsequently produce the Optical waveguides are structured into the polymer coating, and the trench structures for fibre guidance are preferably opened by means of laser ablation.

* * * * *